United States Patent Office 3,378,501
Patented Apr. 16, 1968

3,378,501
CATALYST FOR THE PRODUCTION OF SATURATED ALDEHYDES
Shigeo Kawasaki and Katsumi Nakamura, Tokyo, Japan, assignors to Chisso Corporation, Osaka, Japan, a corporation of Japan
No Drawing. Original application June 11, 1962, Ser. No. 201,268, now Patent No. 3,278,605, dated Oct. 11, 1966. Divided and this application July 7, 1966, Ser. No. 563,384
Claims priority, application Japan, June 13, 1961, 36/20,446; May 18, 1962, 37/20,289
1 Claim. (Cl. 252—457)

ABSTRACT OF THE DISCLOSURE

A catalyst useful for the production of a saturated aldehyde by the hydrogenation of the corresponding unsaturated aldehyde and consisting essentially of metallic nickel and iron as the active catalytic components and an activator therefor. The catalyst is supported by a carrier, preferably pumice. The ratio of nickel to iron in the catalyst is 4.0–9.5 to 6.0–0.5 by weight while the total amount of nickel plus iron in the catalyst is 2–15 grams per 100 ml. of the catalyst. The catalyst is preferably prepared by dipping the carrier into an aqueous solution containing nickel nitrate, iron nitrate and a suitable activator, drying, heating (to 400–500° C.) and reducing (at 400–500° C.).

---

The present application is a divisional of copending application Ser. No. 201,268, filed June 11, 1962, now U.S. Patent 3,278,605.

This invention relates to a process for producing saturated aldehydes by the hydrogenation of corresponding unsaturated aldehydes.

This invention also relates to a durable safely-manageable catalyst having a novel composition which not only has a high hydrogenation ability but also a high selectivity for hydrogenating merely unsaturated linkages without acting on carbonyl groups and which is capable of being handled with such ease and safety that, even when brought into contact with air in its dried state, it neither inflames at all nor lowers its efficiency for a short period of time (e.g., several hours).

In conventional methods for producing saturated aldehydes according to gas phase reactions, catalysts composed mainly of nickel have been used. Namely, there have been proposed, for example, catalysts of a nickel-chromium-manganese system; nickel catalysts prepared by use of activators such as halides, cyanides, nitrates, sulfates and chromates of alkali metals; and catalysts composed mainly of nickel and incorporated with one or two of the metals aluminum, chromium and magnesium, which are present in their oxidized states. These catalysts are adhered to suitable carriers and brough into contact at proper temperatures with vapors of unsaturated aldehydes in which hydrogen has been incorporated to recover saturated aldehydes. All of these conventional catalysts are excellent in selectivity and preferentially hydrogenate double bonds of unsaturated aldehydes to produce saturated aldehydes with high efficiency. These catalysts are prepared with extreme ease and at low costs. Their marked characteristic is that they are comparatively stable in air even in their dried states and can be stored in the dried state as long as for several months under nitrogen without lowering their activities. On the other hand, these catalysts have the drawback that the presence of iron in the catalysts is extremely objectionable.

According to experiments carried out by the present inventors, when a catalyst—which contains, for example, 8–19 g. of metallic nickel and 2.8–3.5 g. of sodium chromate in 100 ml. of a finished catalyst prepared by use of a carrier of refined pumice, which has been prepared by crushing pumice into a size of 5–9 mm., treating the resulting pumice grains with hot dilute nitric acid to dissolve nitric acid soluble components present in the pumice and then washing the pumice with water to remove said components, followed by drying—is maintained at 120° C. and reacted with a gas mixture comprising equimolar amounts of crotonaldehyde vapor and hydrogen by introducing said gas mixture at a space velocity of 100/hr., the composition of the resulting effluent becomes as follows:

| | Percent |
|---|---|
| Crotonaldehyde | 12–16 |
| Butyraldehyde | 78–81 |
| Butanol | 3–4 |
| High boiling substances | 3 |

However, in case a recation is effected under the same conditions as in the above-mentioned example in the presence of a catalyst of said system to which iron has further been added, i.e., by use of a catalyst having the composition of, for example, 8 g. of metallic nickel, 2.8 g. of sodium chromate and 2–6 g. of iron in 100 ml. of finished catalyst, the composition of the resulting effluent becomes:

| | Percent |
|---|---|
| Unreacted crotonaldehyde | 5–10 |
| Butyraldehyde | 62–79 |
| Butanol | 6–24 |
| High boiling substances | 5–9 |

As is clear from the above, in the case wherein iron is present in the catalyst, the formation of butanol increases by more than twice and that of the high boiling substances to 2–3 times as compared with the composition of the former effluent, through the conversion rate of crotonaldehyde is made higher. Thus, the yield of butyraldehyde, the desired product, is markedly lowered, whereby the efficiency of conversion thereof from crotonaldehyde is lowered. This tendency is seen not only in the case of the nickel-sodium chromate system catalyst cited above, but in those catalysts of nickel-sodium chloride, nickel-potassium sulfate, nickel-sodium nitrate, nickel-aluminum oxide, nickel-chromium oxide, nickel-chromium oxide-magnesium oxide and nickel-chromium oxide-manganese oxide systems. The above-mentioned properties are great drawbacks of these catalysts. Therefore, in order to obtain a catalyst having high catalyst activity and long catalyst life, it is desirable to maintain the nickel concentration in the catalyst as high as possible. On the other hand, it is desirable to have the iron concentration in a catalyst having a high nickel concentration as low as possible.

However, in preparing catalyst on a commercial scale, apparatus is required which must be made of an iron alloy such as stainless steel, and therefore it is inevitable that iron, which dissolves out from such apparatus during the production operations with these catalysts, becomes commingled in the catalyst to a certain extent. Accordingly, the starting materials employed, including a carrier, should be selected from those having iron contents as small as possible, and also should be refined to remove the iron content therefrom. This drawback is fatal in case nickel is intended to be reused by recovering it from a catalyst which has lost its activity. Metallic components in a catalyst deprived of its activity can be recovered in the form of an aqueous nitrate solution with an efficiency of 80–90% by calcining the catalyst in the presence of air or oxygen to burn and remove organic substances adhering thereto and then extracting metallic components with dilute nitric acid. In this case, however, a considerable amount of iron is also extracted with the nickel. Therefore, when a catalyst is prepared according to the conventional method, i.e., by use of the recovered nickel at a concentration of more than 10 g. per 100 ml. of the catalyst, its use results not only in large amounts of butanol as a by-product but also in considerable quantities of high boiling by-products. In case said aqueous nitrate solution recovered according to the above-mentioned process is purified to remove the iron content from the solution, no such question would occur. However, in a factory of such a scale that the amount of nickel treated is as small as several hundred kgs. per month, it is not advantageous economically to purify the solution. Therefore, the catalyst, in spite of the fact that it is made from expensive starting materials, must be discarded after merely a single use.

The present inventors have found a catalyst of a nickel-iron-activator system which has a novel composition. This catalyst is composed mainly of the aforesaid nickel and iron, and the remainder is an activator selected from the alkali metal salts, oxides of aluminum, chromium, magnesium and manganese, and mixtures of the foregoing compounds. In this catalyst system, the presence of iron is not objectionable but, on decreasing the amount of nickel corresponding to the iron content within a certain limit, a catalyst having an efficiency as high as that of the aforementioned nickel system catalyst is obtainable. All the catalysts of the nickel-iron-activator system have excellent selective reactivities not only in the production of butyraldehyde according to the gas-phase reaction of crotonaldehyde, but also in the preparation of saturated aldehydes according to the partial hydrogenation of unsaturated aldehydes in the gas and liquid phases.

The composition of the catalyst of the present invention is as follows:

Nickel:Iron=4.0–9.5:6.0–0.5
Nickel+Iron:Activator=7.0–9.0:3.0–1.0 by weight.

The ratio of catalyst components adhered to a carrier varies, depending upon the particular manner of hydrogenation employed.

In the case of a catalyst for a gas phase reaction, its efficiency changes according to the concentration of nickel and iron in the catalyst. Therefore, it is desirable to maintain the total amount of nickel and iron within a certain range. For example, when the total amount of iron and nickel is more than 12 g., the selectivity of reaction is considerably lost, whereby the yield of alcohol is markedly increased. On the contrary, when said total amount is less than 6 g., the conversion rate is lowered and the catalyst life becomes shorter, whereby its commercial value is reduced. Therefore, the total amount of nickel and iron in the finished catalyst should be less than 12 g. per 100 ml. of the catalyst and a preferable range for commercial purposes is 6 to 10 g.

In the case of a catalyst for a liquid phase reaction, the sum of the weight of nickel and iron in 100 ml. of the finished catalyst is optional, and 2–15 g. is sufficient, in general.

The present catalyst is prepared in the following manner: A suitable carrier, for example, a pumice crushed into a proper grain size, is washed with hot dilute nitric acid. After washing with water and drying, the pumice is dipped in an aqueous solution prepared by dissolving nickel nitrate and iron nitrate together with one of the following activator sources: chromates; bichromates; a halide, nitrate or sulfate of an alkali metal; oxides of manganese, aluminum, chromium or magnesium; and mixtures of the foregoing compounds. After adsorption is complete, the pumice is slowly evaporated to dryness. Then, the pumice is heated at 400°–500° C. for several hours followed by a reduction with hydrogen at 400°–500° C. for 5–10 hours.

Reaction conditions for achieving the object of the present invention by use of the catalyst of said system vary more or less depending on the variations of starting materials and whether the reaction is taking place in the gas or liquid phase. In general, the reaction temperatures range desirably from 90° to 150° C. It is of course necessary ot vary said temperature according to the activities of the catalyst employed. Particularly, in gas phase reactions, when a fresh catalyst having high activity is employed, it is desirable to carry out the reaction at relatively low temperatures. When the temperature is made higher, the amount of saturated alcohol formed becomes larger and, at the same time, undesirable reaction such as the decomposition reaction and the formation of high boiling substances become vigorous. In case the activity of catalyst is lowered, it is necessary to raise the temperature to increase the conversion. At temperatures above 150° C., however, the formation of saturated alcohol becomes marked and therefore it is not desirable to elevate the temperature higher than 150° C.

In contrast thereto, in liquid phase reactions, no such difficulties because of an increase of temperature as mentioned above are encountered. Generally, however, a sufficiently satisfactory reaction velocity is obtainable within the aforesaid temperature range.

It is natural that the ratio of unsaturated aldehyde to hydrogen in a reaction system differs fundamentally depending on reaction modes. In gas phase reactions, the molar ratio of unsaturated aldehyde to hydrogen present in a gaseous mixture to be introduced into a catalyst layer may preferably be 1.0:0.7–1.0. In case the ratio of hydrogen is higher than said range, the yield of saturated alcohol increases. Furthermore, to incorporate into said gas a gaseous material as a third component, which has nothing to do with the reaction, such as, for example, water vapor or nitrogen, is also effective for moderating the temperature of the catalyst layer in order to inhibit undesirable side reactions and to prolong the catalyst life. As the third component, water vapor is particularly effective and preferable, since the resulting reaction product can be collected with ease. The addition of a third component is indispensable where an unsaturated aldehyde is to be hydrogenated in case the vapor pressure is too low to obtain, at the reaction temperature employed, a gaseous mixture having a desirable ratio. On the other hand, in a partial hydrogenation in the liquid phase, the partial pressure of hydrogen can be selected optionally. In the present invention, like general hydrogenation, it is desirable to have the hydrogen partial pressure relatively high. According to the experiments of the present inventors, however, a hydrogen partial pressure of 3–20 kg./cm.$^2$ gives a reaction velocity sufficiently satisfactory for commercial purposes.

For the purpose of the present invention, the conversion of unsaturated aldehyde in one pass of reaction should be inhibited to less than 85%. Particularly, when gas-phase reaction apparatus of commercial scale is used, it is preferable to restrain the conversion to a low degree. In case the conversion becomes more than 85%, the formation of saturated alcohol is marked, but this is out of the question where the co-production of saturated alcohol is desired.

Both the liquid and gas-phase reaction modes have respective characteristics. The liquid-phase reaction mode is suitable for small scale production, but is unsuitable for mass production or continuous operations. However, said mode gives moderate reactions (local heat-generation is avoidable) and a favorable efficiency, and in case the conversion is inhibited properly, side reactions provide no particular problem. In contrast to this, the gas-phase reaction mode is suitable for large scale production, as the reactions are always continuous. On the other hand, it has the drawback that side reactions are somewhat more predominant than those obtained in the liquid phase reaction. Generally, in treating a specific usaturated aldehyde, either of these reactions may be adopted. Unsaturated aldehydes, however, have respective intrinsic vapor pressures and the higher aldehydes show low vapor pressures. Therefore, it is impossible to prepare a gaseous mixture, desirable for the present invention, having such a ratio of starting materials as mentioned before, unless a third material, which is inert to the gaseous reaction, is added thereto in order to lower the partial pressures of the starting materials, i.e., the unsaturated aldehyde and hydrogen. The addition of the third material restrains the reaction to lower the conversion and hence lowers the volume efficiency of reaction apparatus. The amount of the third material added may range from 0.2–2.0 mol. per mol. of unsaturated aldehyde and is preferably 0.5–1.2 mol., in general. On the contrary, in the liquid-phase reaction mode, no such considerations are necessitated and the present invention is applicable to all the unsaturated aldehydes, regardless of their carbon number. The present invention, however, is not one that restricts the reaction according to the properties of said unsaturated aldehydes, and hence, either reaction can be adopted by means of a suitable treatment procedure as discussed above.

Generally, in the case of treating unsaturated aldehydes having from 3 to 6 carbon atoms, either the liquid-phase or the gas-phase reaction mode may be adopted. However, in treating unsaturated aldehydes having more than 6 carbon atoms, it is preferable to employ the liquid-phase reaction mode.

Another significant characteristic of the catalyst of the present invention lies in that the catalyst can be recovered with extreme ease. As mentioned before, the conventional catalyst, which is prepared by calcining nickel nitrate composed mainly of nickel and the remainder a combination of various activators and which is used for the production of butyraldehyde by partially hydrogenating selecting crotonaldehyde according to the gas-phase reaction mode, has a high activity and a high selective reactivity in itself and is useful. The unique drawback of this catalyst is that it is affected in a disadvantageous manner by the presence of iron. An aqueous solution of nickel nitrate, obtained by calcining a discarded catalyst deprived of its activity and extracting with dilute nitric acid, is contaminated with iron, which has been incorporated therein during the preparation of the catalyst, during its uses, and during the recovery operation carried out with the discarded catalyst.

For example, data obtained through the following experiment show this fact: A catalyst was prepared by using pumice as a carrier and incorporating 10 g. of nickel and 2 g. of sodium dichromate (0.80 g. as chromium) into 100 ml. of finished catalyst carried by said pumice, and the catalyst was put into a multi-tube reactor for commercial production. This catalyst was discarded after having been employed continuously in the production of butyraldehyde for 37 days according to the gas-phase reaction mode under the following reaction conditions:

Reaction temperature=120°–150° C.
Crotonaldehyde vapor:hydrogen=1:0.7–0.9 (molar ratio)
Water vapor mixing ratio=0.8–1.1 mol. per mol. of crotonaldehyde
Space velocity of crotonaldehyde=100/hr.

From said discarded catalyst, an aqueous solution of nickel nitrate was recovered by calcining said catalyst in air at 450° to 500° C. to burn organic substances, crushing the catalyst, charging the crushed catalyst into a stainless steel vessel, treating the catalyst with an equal amount of 30% nitric acid to heat and dissolve the catalyst components and washing the catalyst three times with an equal amount of water employing ⅓ of the water each time. 100 ml. of the recovered aqueous solution of nickel nitrate contained 4.3 g. of nickel, 0.8 g. of iron and 0.34 g. of chromium.

By use of the said recovered nickel solution, the present inventors prepared, in their laboratory, a catalyst having a different nickel concentration by decomposing the nitrate carried by crushed pumice grains washed with hot dilute nitric acid, having a grain size of 5–9 mm., and hydrogenating said grains. Then the inventors examined the partial hydrogenation of crotonaldehyde at 120° C. in a 25 mm. reaction tube in the presence of said catalyst under the following conditions:

Crotonaldehyde:hydrogen=1:1 (molar ratio)
Space velocity of crotonaldehyde=100/hr.

The results of these experiments are set forth in Table 1.

TABLE 1

| Experiment No. | 1 | 2 | 3 | 4 |
|---|---|---|---|---|
| Catalyst composition (g./100 ml. catalyst): | | | | |
| Nickel | 12.2 | 9.9 | 7.9 | 6.1 |
| Iron | 2.45 | 1.9 | 1.55 | 1.2 |
| Chromium | 0.97 | 0.78 | 0.63 | 0.48 |
| Composition of product (Percent): | | | | |
| Crotonaldehyde | 5 | 7 | 12 | 16 |
| Butyraldehyde | 57 | 70 | 78 | 79 |
| Butanol | 26 | 15 | 6 | 2 |
| Residue | 12 | 8 | 4 | 3 |

In the case of the catalyst compositions employed in Experiment Nos. 1 and 2, the selectivities for partial hydrogenation were low and large amounts of butanol were obtained as a by-product while the catalyst were fresh as shown in Table 1. Also, the formation and the decomposition of high boiling substances were marked. Moreover, the activities of the catalysts were lowered so rapidly that several days afterwards no conversion of crotonaldehyde occurred. On the other hand, in the case of the catalyst compositions used in Experiments Nos. 3 and 4, the said drawbacks were markedly improved and results were obtained which were as good as those of the original catalyst of the nickel-sodium dichromate system.

Each of the above-listed experiments employed, as the composition of recovered catalyst, the composition of aqueous nitrate solution per se extracts from a discarded catalyst, except that the nickel concentration was lowered. In this case, however, it does not matter or is it rather necessary, in general, to adjust the composition to a desired one by properly supplementing wanted components thereto. Further, the recovery of discarded catalyst may be repeated in the aforementioned ways.

As a process for recovering and regenerating a discarded catalyst, the following method is also effective:

Namely, it is also possible to regenerate a discarded catalyst by calcining it to burn and remove organic substances adhered thereto, mixing a suitable amount (0.2–0.3 part per part of the discarded catalyst) of crushed pumice (desirably having the same grain size as that of the discarded catalyst), with the discarded catalyst, which is kept in the original form, adding thereto dilute acid (containing $HNO_3$ of 1.1–1.2 times the amount of nitric acid sufficient to dissolve nickel and iron present in the discarded catalyst) having an appropriate concentration until the solids are completely covered, supplementing an activator if necessary, heating the resulting mixture for several hours, heating it to dryness while stirring on a stainless steel vessel (dish type), calcining it to decompose nitrate, and then reducing with hydrogen. This process was carried out, for example, in the following manner:

To a calcined discarded catalyst having the aforementioned composition, 3 parts by volume of crushed pumice per 10 parts by volume of said discarded catalyst were added. To the resulting mixture were added 7 parts by volume of dilute nitric acid containing 0.9 g./100 ml. of sodium bicarbonate and 45 g./100 ml. of nitric acid. To this mixture, a proper amount of water may be added, if necessary, until the solids are completely covered with the solution. The resulting solution was heated for several hours at such a temperature wherein the dilute nitric acid did not boil (80°–90° C.). The total amount was charged into a stainless steel flat dish and heated, while stirring moderately, to evaporate the liquid portion to dryness. Several percent by weight of solids were crushed during said operations and the amount available as a fixed bed catalyst was 11.5–11.8 parts by volume. This was calcined at 400°–500° C. and further reduced with hydrogen to obtain a catalyst. The catalyst thus obtained had favorable activity as well as selectivity and was satisfactory as a catalyst for selective partial hydrogenation. 100 ml. of the finished catalyst contained 7.5 g. of nickel, 1.5 g. of iron and 2.0 g. of sodium dichromate.

Generally, the recovery and regeneration of the catalyst can be repeated without supplementing nickel thereto until the ratio by weight of nickel to iron becomes approximately 1:1. A powdery substance, which is formed in the preparation of a fixed bed catalyst, is available as a suspending catalyst in the liquid phase reaction, after crushing it into a proper size.

(1) Catalyst prepared by adding iron to a nickel-sodium chromate system (i) Preparation of catalyst.—Pumice grains crushed into a grain size of 5–9 mm. were cleansed with hot dilute nitric acid, washed with water and dried to obtain refined pumice grains which were employed as a carrier. This pumice had a capacity of carrying about 17 g. of metal, at its maximum, per 100 ml. of catalyst. To a definite amount of said refined pumice, an aqueous solution of proper concentration, obtained by dissolving simultaneously nickel nitrate, sodium chromate and iron nitrate, was added in such a calculated amount that the finished catalyst contained desired amounts of catalyst components. The resulting mixture was gradually evaporated to dryness and heated at 450° C. for several hours after drying to decompose and remove nitric acid, followed by reduction with hydrogen at 450° C. for an additional 5–10 hours to obtain the desired catalyst.

(ii) Experimental process.—100 ml. of the catalyst was charged into a steel pipe of 25 mm. in inner diameter and heated from the outside by means of an electric heating wire. A gas mixture comprising equimolar amounts of crotonaldehyde and hydrogen was passed through from the upper end of the steel pipe at such a rate that the space velocity of crotonaldehyde became 100/hr. while also controlling the temperature at the center part of the catalyst to 120° C. The reaction product was coagulated and collected with cold water at about 5° C. and the composition thereof was measured by distillation analysis.

(iii) Results of experiments.—The composition of catalyst and the results of analysis were as follows:

TABLE 2.—Ni-Na$^2$Cr$^2$O-Fe CATALYST SYSTEM

| Catalyst No. | Catalyst composition (g./100 ml. of catalyst) | | | Composition of product (weight percent) | | | |
|---|---|---|---|---|---|---|---|
| | Metallic nickel | Sodium chromate | Metallic iron | Crotonaldehyde | Butyraldehyde | Butanol | Residue |
| 1 | 12.0 | 0.0 | 0.0 | 4 | 61 | 28 | 7 |
| 2 | 10.0 | 0.0 | 0.0 | 7 | 67 | 21 | 5 |
| 3 | 8.0 | 0.0 | 0.0 | 10 | 70 | 15 | 5 |
| 4 | 10.0 | 3.5 | 0.0 | 12 | 81 | 4 | 3 |
| 5 | 8.0 | 2.8 | 0.0 | 16 | 78 | 3 | 3 |
| 6 | 8.0 | 2.8 | 2.0 | 10 | 79 | 6 | 5 |
| 7 | 8.0 | 2.8 | 3.0 | 8 | 76 | 10 | 6 |
| 8 | 8.0 | 2.8 | 4.0 | 7 | 68 | 18 | 7 |
| 9 | 8.0 | 2.8 | 5.0 | 5 | 62 | 24 | 9 |
| 10 | 6.0 | 3.5 | 4.0 | 15 | 79 | 3 | 3 |
| 11 | 6.0 | 3.5 | 5.0 | 13 | 77 | 6 | 4 |
| 12 | 5.0 | 2.8 | 5.0 | 11 | 76 | 8 | 5 |
| 13 | 3.0 | 2.8 | 5.0 | 18 | 62 | 13 | 7 |
| 14 | 3.0 | 2.8 | 3.0 | 23 | 70 | 4 | 3 |

Catalyst Nos. 4 and 5 are those having been considered, by the present inventors, as the standard compositions of conventional catalysts. In case iron is added to these catalysts their activities gradually become higher, which results in the formation of a large amount of high polymerization by-products as well as in forming a large quantity of butanol. Therefore, where the formation of butanol as a by-product is objectionable, these catalysts are not preferred. Moreover, the decomposition reaction of crotonaldehyde, which is merely 2–3% when a standard catalyst of this system is used, increases up to 7–10%. Therefore, the efficiency of conversion from crotonaldehyde to butyraldehyde is markedly lowered.

In the aforesaid case, when the nickel content is decreased accordingly as the iron content is increased, said activity is gradually improved to give a catalyst having a favorable efficiency, which compares quite well with the catalyst of standard composition, until a certain ratio of nickel to iron is reached.

(2) Catalyst prepared by adding iron to a nickel-alkali metal salt system

The activity as well as the efficiency of a nickel-alkali metal salt system catalyst is also obstructed by the presence of iron, and the present invention is applicable thereto.

The preparation of catalyst, experimental conditions and the process steps are the same as in (2). The results of the experiment were as shown in Table 3.

TABLE 3.—NI-ALKALI METAL SALTS-FE CATALYST SYSTEM

| Catalyst No. | Catalyst Composition (g./100 ml. of catalyst) | | | Composition of Reaction Product (weight percent) | | | |
|---|---|---|---|---|---|---|---|
| | Metallic nickel | Alkali Metal Salt | Metallic iron | Crotonaldehyde | Butyraldehyde | Butanol | Residue |
| 15 | 10.0 | NaCl, 2.8 | 0.0 | 10 | 83 | 5 | 2 |
| 16 | 10.0 | NaCl, 2.8 | 2.0 | 6 | 82 | 8 | 4 |
| 17 | 10.0 | NaCl, 2.8 | 4.0 | 5 | 69 | 17 | 9 |
| 18 | 8.0 | NaCl, 2.8 | 4.0 | 8 | 79 | 8 | 5 |
| 19 | 6.0 | NaCl, 2.8 | 4.0 | 11 | 82 | 4 | 3 |
| 20 | 5.0 | NaCl, 2.8 | 4.0 | 16 | 78 | 4 | 2 |
| 21 | 10.0 | K$_2$SO$_4$, 1.18 | 0.0 | 12 | 81 | 3 | 4 |
| 22 | 10.0 | K$_2$SO$_4$, 1.18 | 2.0 | 7 | 83 | 3 | 5 |
| 23 | 10.0 | K$_2$SO$_4$, 1.18 | 4.0 | 4 | 71 | 15 | 10 |
| 24 | 8.0 | K$_2$SO$_4$, 1.18 | 4.0 | 9 | 77 | 7 | 7 |
| 25 | 6.0 | K$_2$SO$_4$, 1.18 | 4.0 | 12 | 79 | 5 | 4 |
| 26 | 4.0 | K$_2$SO$_4$, 1.18 | 4.0 | 16 | 78 | 3 | 3 |
| 27 | 10.0 | NaNO$_2$, 3.35 | 0.0 | 9 | 82 | 5 | 4 |
| 28 | 10.0 | NaNO$_2$, 3.35 | 2.0 | 6 | 80 | 8 | 6 |
| 29 | 10.0 | NaNO$_2$, 3.35 | 4.0 | 3 | 68 | 18 | 11 |
| 30 | 8.0 | NaNO$_2$, 3.35 | 4.0 | 5 | 82 | 7 | 6 |
| 31 | 6.0 | NaNO$_2$, 3.35 | 4.0 | 10 | 82 | 4 | 4 |
| 32 | 4.0 | NaNO$_2$, 3.35 | 4.0 | 13 | 80 | 4 | 3 |

The catalyst of this system is also deteriorated gradually in properties with the incorporation of iron, but it can be made into an effective catalyst by decreasing its nickel content.

(3) Catalyst prepared by adding iron to a Ni-Al, Cr or Mg oxide system (i) Preparation of catalyst.—The process of preparation is the same as described above. All of the metals employed as catalyst components are in the form of nitrates.

(ii) Experimental conditions.—The reaction conditions as well as the process steps are the same as the preceding experiments except for the reaction temperatures.

(iii) Results of experiment.—The catalyst of this system has a favorable selectivity of reaction, but when iron is not added thereto, its activity is low at low temperatures. The preferred temperature of reaction is 150°–180° C. It has been found that on adding iron, this catalyst shows sufficient activity even at a temperature lower than its intrinsic reaction temperature without losing its favorable selectivity to form a novel catalyst having excellent catalytic ability.

The iron content in the catalyst then partakes both of the main catalytic action and cocatalytic action.

Advantages obtainable by the practice of the process of the present invention are:

(1) A part of the nickel can be substituted by iron, which is inexpensive, without any variation in effects.

(2) As the presence of iron in the catalyst is permitted in the range defined herein, commercially available nickel (as catalyst) or other metals or compounds (as activator) can be used.

(3) A method for recovering the catalyst has been carried out, in general, by heating in air a catalyst deprived of its activity to burn a resinous polymer adhered thereto and treating the burnt material with hot dilute nitric acid in a stainless steel vessel to extract soluble components in the discarded catalyst as an aqueous nitrate solution. In this case, however, a marked amount of iron is present together with the original components of the catalyst. Therefore, when the catalyst has been prepared by TABLE 4.—Ni-Al, Cr OR Mg OXIDES-Fe SYSTEM

| Catalyst No. | Catalyst Composition (g/100 ml. of Catalyst) | | | Reaction Temperature (° C.) | Composition of Reaction Product (weight percent) | | | |
|---|---|---|---|---|---|---|---|---|
| | Metallic Ni | Metal Oxide | Metallic Iron | | Croton-aldehyde | Butyr-aldehyde | Butanol | Residue |
| 33 | 10.0 | Al$_2$O$_3$, 2.15 | 0.0 | 150 | 8 | 82 | 5 | 5 |
| 34 | 10.0 | Al$_2$O$_3$, 2.15 | 2.0 | 110 | 5 | 80 | 7 | 8 |
| 35 | 10.0 | Al$_2$O$_3$, 2.15 | 4.0 | 110 | 2 | 68 | 18 | 12 |
| 36 | 8.0 | Al$_2$O$_3$, 2.15 | 4.0 | 110 | 6 | 81 | 7 | 6 |
| 37 | 6.0 | Al$_2$O$_3$, 2.15 | 4.0 | 110 | 12 | 79 | 5 | 4 |
| 38 | 4.0 | Al$_2$O$_3$, 2.15 | 4.0 | 110 | 19 | 77 | 2 | 2 |
| 39 | 10.0 | Cr$_2$O$_3$, 1.62 | 0.0 | 170 | 5 | 88 | 3 | 4 |
| 40 | 10.0 | Cr$_2$O$_3$, 1.62 | 2.0 | 120 | 3 | 86 | 6 | 5 |
| 41 | 10.0 | Cr$_2$O$_3$, 1.62 | 4.0 | 120 | 2 | 78 | 12 | 8 |
| 42 | 10.0 | Cr$_2$O$_3$, 1.62 | 5.0 | 120 | 2 | 65 | 21 | 12 |
| 43 | 8.0 | Cr$_2$O$_3$, 1.62 | 4.0 | 120 | 4 | 82 | 8 | 6 |
| 44 | 6.0 | Cr$_2$O$_3$, 1.62 | 4.0 | 120 | 9 | 84 | 3 | 4 |
| 45 | 4.0 | Cr$_2$O$_3$, 1.62 | 4.0 | 120 | 13 | 82 | 3 | 2 |
| 46 | 2.0 | Cr$_2$O$_3$, 1.62 | 4.0 | 120 | 25 | 71 | 2 | 2 |
| 47 | 10.0 | Cr$_2$O$_3$, 0.81 MgO, 0.92 | 0.0 | 170 | 5 | 90 | 2 | 3 |
| 48 | 10.0 | MgO, 0.92 | 2.0 | 120 | 2 | 86 | 7 | 5 |
| 49 | 10.0 | MgO, 0.92 | 4.0 | 115 | 2 | 79 | 12 | 7 |
| 50 | 8.0 | MgO, 0.82 | 4.0 | 115 | 4 | 84 | 7 | 5 |
| 51 | 6.0 | MgO, 0.92 | 4.0 | 115 | 9 | 83 | 4 | 4 |
| 52 | 4.0 | MgO, 0.92 | 4.0 | 115 | 17 | 79 | 2 | 2 |
| 53 | 4.0 | MgO, 0.92 | 4.0 | 120 | 10 | 82 | 4 | 3 |

(4) Catalyst prepared by adding iron to a Ni-chromium oxide-Mn system

As explained in the preceding paragraph, the preferred temperature to be employed with a Ni-metal oxide catalyst system is high. In order to lower said temperature, a Ni-chromium oxide-Mn catalyst system has been devised. In the case of the catalyst of this system also, the addition of iron could give satisfactory results.

Processes for the preparation and for the experiment carried out with this catalyst are the same as in the preceding paragraph. The reaction temperature is 120° C.

conventional procedures said iron has caused undesirable side reactions and hence the iron content has been required to be separated. In the present invention, however, since the iron is one of the components of the catalyst, no such operations are required, but merely the measuring of the iron content to control the ratio of catalyst components.

The following examples demonstrate the present invention as applied to commercial production apparatus.

Example I (1) Preparation of catalyst.—15 kg. of metallic nickel

TABLE 5.—Ni-CHROMIUM OXIDE-Mn-Fe CATALYST SYSTEM

| Catalyst No. | Catalyst Composition (g./100 ml. of catalyst) | | | | Reaction Product Composition (weight percent) | | | |
|---|---|---|---|---|---|---|---|---|
| | Metallic nickel | Chromium oxide | Manganese oxide | Metallic Iron | Crotonaldehyde | Butyraldehyde | Butanol | Residue |
| 54 | 10.0 | Cr$_2$O$_3$, 1.62 | MnO 0.72 | 0.0 | 13 | 81 | 3 | 3 |
| 55 | 10.0 | Cr$_2$O$_3$, 1.62 | 0.29 | 0.0 | 10 | 84 | 3 | 3 |
| 56 | 10.0 | Cr$_2$O$_3$, 1.62 | 0.29 | 2.0 | 5 | 81 | 9 | 5 |
| 57 | 10.0 | Cr$_2$O$_3$, 1.62 | 0.29 | 4.0 | 2 | 70 | 19 | 9 |
| 58 | 8.0 | Cr$_2$O$_3$, 1.62 | 0.29 | 4.0 | 6 | 78 | 10 | 6 |
| 59 | 6.0 | Cr$_2$O$_3$, 1.62 | 0.29 | 4.0 | 11 | 82 | 3 | 4 |
| 60 | 4.0 | Cr$_2$O$_3$, 1.62 | 0.29 | 4.0 | 18 | 77 | 2 | 3 |

As seen from the results of the experiments above, when iron is further added to a catalyst having such a composition that it is considered as a standard, the selectivity of the catalyst is lost, resulting in a higher production rate of the by-product butanol. Also, many side reactions occur, whereby not only the formation rate of high polymerizates is increased but the decomposition becomes vigorous to lower over-all efficiencies. In such cases, when the nickel content in the catalyst is decreased relative to the iron content, its selectivity is recovered.

and 9 kg. of soft steel flakes were dissolved in 40% nitric acid, to which water was so added as to form an aqueous nitrate solution having a nickel concentration of 10 g./100 ml. To this solution, 25 kg. of sodium chromate (Na$_2$CrO$_4 \cdot$10H$_2$O) was added and dissolved. Pumice, employed as a carrier, was prepared by crushing it into 10–12 mm. size, washing with water to wash off the particles and drying.

300 l. of said pumice was charged into the aforesaid aqueous nitrate solution and the solution was heated gently to evaporate it to dryness. The resulting dried material was calcined at 450° C. in a muffle furnace to decompose the nitrate and was then reduced in a hydrogen current to obtain a catalyst.

100 ml. of the catalyst thus obtained contained 4.85 g. of metallic nickel, 3.52 g. of metallic iron and 1.25 g. of chromium compound as metallic chromium.

(2) Production of butyraldehyde.—The apparatus employed for production was a cell and tube type reactor having a large number of reaction tubes of 41.6 mm. in inner diameter and 2.2 m. in length. The above-mentioned catalyst was charged into said tubes and hot oil was circulated in cells outside the tubes to control the reaction temperature.

The initial reaction temperature was 112° C., measured at the center of the catalyst. The reaction temperature was gradually raised up to 150° C. according to the relative difficulty in controlling the reaction temperature and to the rate of conversion. Since the formation of butanol becomes higher at above 150° C., the use of said catalyst was discontinued at a proper temperature before the reaction temperature reached 150° C.

The reaction was carried out by maintaining the space velocity of crotonaldehyde at 100±5/hr., the molar ratio of crotonaldehyde to hydrogen at 0.9–1.0 and the conversion rate from crotonaldehyde to butyraldehyde at 50–70%, whereby it was possible to operate continuously for 58 days. Unreacted crotonaldehyde was recycled and the yield of butyraldehyde reached 92%.

Example II 25 g. of nickel nitrate [Ni(NO$_3$)$_2$·6H$_2$O], 21 g. of ferric nitrate [Fe (NO$_3$)$_3$·9H$_2$O] and 1.25 g. of anhydrous Glauber's salt were dissolved in 100 ml. of water. The resulting aqueous solution was mixed with 100 ml. of crushed pumice having a grain size of 4–6 mm. and was heated dry with gentle stirring. On heating the dried pumice for several hours in a muffle furnace maintained at 450°–500° C., nitrates contained in the pumice were decomposed. The thus obtained oxide was put in a circular furnace of the type heating from the outside, reduced at 420°–450° C. by introducing hydrogen, cooled down to room temperature in a hydrogen stream and taken out after substituting hydrogen for the hydrogen. The thus obtained catalyst is not inflamed, unlike conventional nickel catalysts, and therefore not only can it be safely handled even in air but also it can be stored in its dried state in a nitrogen current.

95 ml. of this catalyst was charged into a vertical reactor made of steel pipe with a 25 mm. diameter. Then, acrolein was added at a rate of 30 ml. per hour and evaporated on a crushed pumice layer 10 cm. in height, which had been put on the catalyst layer, while maintaining the temperature at 95–105° C. by heating from the outside by means of an electric heating wire. Simultaneously, hydrogen was continuously introduced into the reactor at a rate of 9–9.5 l./hr. A vapor dischrarged from the reactor was condensed by means of a condenser, in which was used a brine having a temperature of −10° C. The analytical values of the condensate were 13–17% of unreacted acrolein, 72–82% of propionaldehyde, 3–5% of propanol and about 4% of high boiling substances. Thus, the analysis shows a favorable activity and selective reactivity of the catalyst and that very little decomposition is obtained.

Example III

A catalyst containing, per 100 ml., 5.5 g. of nickel, 4 g. of iron, 1.2 g. of chromium oxide, and 0.4 g. of manganese oxide was prepared using as a carrier a crushed pumice having a grain size of 4–6 mm. which was obtained by the pyrolysis of nitrates in the same manner as in Example I. 90 ml. of this catalyst was charged into the same reactor as mentioned in Example I, to which a 75% aqueous acrolein solution [acrloein: water=1:1 (mole)] was added dropwise at a rate of 40 ml./hr., while maintaining the catalyst temperature at 112°–115° C., and hydrogen was simultaneously introduced at a rate of 9 l./hr. The reaction product was cooled down to −5° C., condensed and collected.

The following results were obtained:

| | Percent |
|---|---|
| Acrolein | 74–77 |
| Propanol | 2–2.5 |
| High boiling substances, about | 1.5 |
| Propionaldehyde | 93 |

Example IV

Crushed pumice grains having a grain size of 10–14 mm. were charged into an aqueous solution obtained by mixing and dissolving nitrates of nickel, iron and aluminum, and evaporated to dryness. By use of these dried pumice grains, a catalyst containing, per 100 cc., 3.5 g. of nickel, 2 g. of iron and 1.8 g. of aluminum was prepared. 1,000 cc. of this catalyst was put into an erect pressure reaction tube having an inner diameter of 50 mm. and heated from the outside to 120°–130° C. A crotonaldehyde-containing reaction liquid preheated to 110°–120° C. was poured on the catalyst layer at a rate of 20 l./hr. and recycled, while maintaining the pressure of hydrogen at 18 kg./cm.$^2$ (gauge). The reaction was continued until the conversion rate of crotonaldehyde was nearly 75%, whereby the following results were obtained:

| | | |
|---|---|---|
| Average conversion rate | kg./hr. | 0.9 |
| Butanol | percent | 2.0 |
| High boiling susbtances | do | 1.7 |
| Butyraldehyde | do | 94 |

Example V

A catalyst was prepared by the pyrolysis and hydrogen reduction of nitrates. This catalyst contained 25 g. of nickel, and iron, respectively, and 12 g. of potassium dichromate, per 100 g. of diatomaceous earth. 30 kg. of this catalyst was mixed with 2,000 l. of crotonaldehyde. The resulting mixture was charged into a 2,800 l. autoclave of the stirring type, heated to 115–120° C. and reacted while maintaining a hydrogen pressure at 6 kg./cm.$^2$ (gauge).

After eight hours, the following results were obtained:

| | Percent |
|---|---|
| Crotonaldehyde | 73 |
| Butanol | 1.5 |
| High boiling substances | 1.5 |
| Butyraldehyde | 95 |

The effluent was allowed to stand after cooling and then the supernatant was taken out, leaving 150 l. of the reaction liquid containing the catalyst. To this effluent, fresh crotonaldehyde was supplied to make the total amount of the catalyst-containing liquid 2,000 l. Then the liquid was reacted under the same conditions as mentioned above. Although the activity of the catalyst was gradually lowered by repeating such operations, the catalyst was available for 9 runs repeatedly until the conversion rate of crotonaldehyde reached 70–75%, which required 13 hours.

Example VI 19.5 g. of nickel nitrate, 25 g. of iron nitrate, 5.3 g. of chromium nitrate and 8 g. of magnesium nitrate were dissolved in 60 ml. of water, with which 100 ml. of pumice crushed into a grain size of 5–7 mm. was mixed. The mixture was evaporated to dryness with agitation and allowed to stand in a muffle furnace maintained at 500° C. to decompose these nitrates. The resulting calcined material was charged into a steel pipe of 25 mm. in inner diameter. Into the steel pipe, hydrogen was introduced to reduce said calcined material for 5 hours while maintaining the temperature at 400°–420° C. by heating the pipe from the outside. After cooling down to room temperature in a hydrogen stream, the gas inside the pipe was substituted with nitrogen and the material was taken out in the air. The thus obtained catalyst was charged into the same reactor as mentioned in Example I. From the top of the reactor, 2-ethyl-crotonaldehyde and water were separately added dropwise at rates of 45 g./hr. and 10 g./hr. respectively, while maintaining the temperature of catalyst layer at 125°–130° C., evaporated onto crushed pumice of 10 cm. in height, charged on the catalyst and passed through the catalyst layer.

The composition of the effluent was as follows:

| | Percent |
|---|---|
| Unreacted 2-ethyl-crotonaldehyde | 16–21 |
| 2-Ethylbutyraldehyde | 74–76 |
| 2-Ethylbutanol | 3–4 |
| High boiling substances | 2–4 |
| 2-Ethylbutyraldehyde | >90 |

Example VII

A catalyst powder formed in preparing a pumice-carried catalyst for gas phase hydrogenation was further pulverized to such an extent that the particle could pass a 30 mesh screen. Employing the pumice particles thus obtained, a catalyst containing, per 100 cc., 12 g. of nickel, 5 g. of iron, and 3.6 g. of sodium chromate was prepared. 80 l. (weight: 38 kg.) of this catalyst was charged into a 2,800 l. autoclave of the stirring type and heated to 120° C. together with 2,000 l. of 2-ethyl-3-propylacrolein, followed by stirring. Reacting for five hours under a hydrogen pressure of 5.5–6 kg./cm.$^2$ (gauge), 75% of 2-ethyl-3-propylacrolein was converted to obtain 2-ethyl-hexaldehyde at an efficiency of 94%. According to the method described in Example IV, the effluent was cooled and allowed to stand and then the supernatant was taken out, leaving about 100 l. of the effluent together with the catalyst. To this effluent, 2-ethyl-3-propylacrolein was freshly supplied to make the total amount of the catalyst-containing effluent 2,000 l., which was reacted in the same manner as mentioned above. Due to the repetition of 5 runs, the reaction time was prolonged to 6 hours, but the catalyst could be used repeatedly for 13 runs by suitably elevating the reaction temperature up to 140° C.

Example VIII 7 g. of potassium chloride was dissolved in 50 cc. of water, to which 50 g. of nickel nitrate [Ni(NO$_3$)$_2$·6H$_2$O] and 80 g. of ferric nitrate [Fe(NO$_3$)$_3$·9H$_2$O] were added, heated, and dissolved. To this solution, 150 cc. of diatomaceous earth was added and solidified while stirring. This was heated at 450–480° C. for 4 hours to decompose the nitrates. The resulting oxide was reduced for 2 hours in a hydrogen stream at a temperature of 440°–450° C. and then allowed to stand at room temperature under a hydrogen atmosphere to obtain a catalyst.

20 cc. of this catalyst was charged into a 300 cc. autoclave of the shaking type together with 1,000 cc. of 2-ethyl-3-propylacrolein and was reacted at 90°–100° C. under a hydrogen pressure of 20 kg./cm.$^2$ (gauge), while shaking. After 7 hours, 2-ethyl hexaldehyde was obtained at a conversion rate of 73% with an efficiency of 95%. This catalyst was repeatedly available for 8 runs under the above-mentioned reaction conditions.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A catalyst useful for the production of a saturated aldehyde by the hydrogenation of the corresponding unsaturated aldehyde consisting essentially of metallic nickel and metallic iron as the active catalytic components and an activator therefor selected from the group consisting of alkali metal salts, the oxides of aluminum, chromium, magnesium and manganese and mixtures of the foregoing compounds, said catalytic components and said activator being supported on pumice, the ratio of nickel to iron being 4.0–9.5 to 6.0–0.5 by weight, the ratio of nickel plus iron to the activator being 7.0–9.0 to 3.0–1.0 by weight and the total amount of nickel plus iron in the catalyst being 2–15 grams per 100 ml. of the catalyst.

References Cited

UNITED STATES PATENTS

| 1,266,782 | 5/1918 | Ellis | 252—459 |
| 1,673,691 | 6/1928 | Liljenroth et al. | 252—459 |
| 2,038,566 | 4/1936 | Huettner et al. | 252—459 |
| 2,512,608 | 6/1950 | Buchmann | 252—459 |
| 3,041,385 | 6/1962 | Bourne et al. | 252—459 |
| 3,113,166 | 12/1963 | Weesner | 252—459 |
| 3,205,182 | 9/1965 | Padovani et al. | 252—454 |
| 3,254,110 | 5/1966 | Sennewald et al. | 252—459 |

DANIEL E. WYMAN, *Primary Examiner.*

C. F. DEES, *Assistant Examiner.*